United States Patent Office 3,083,716
Patented Apr. 2, 1963

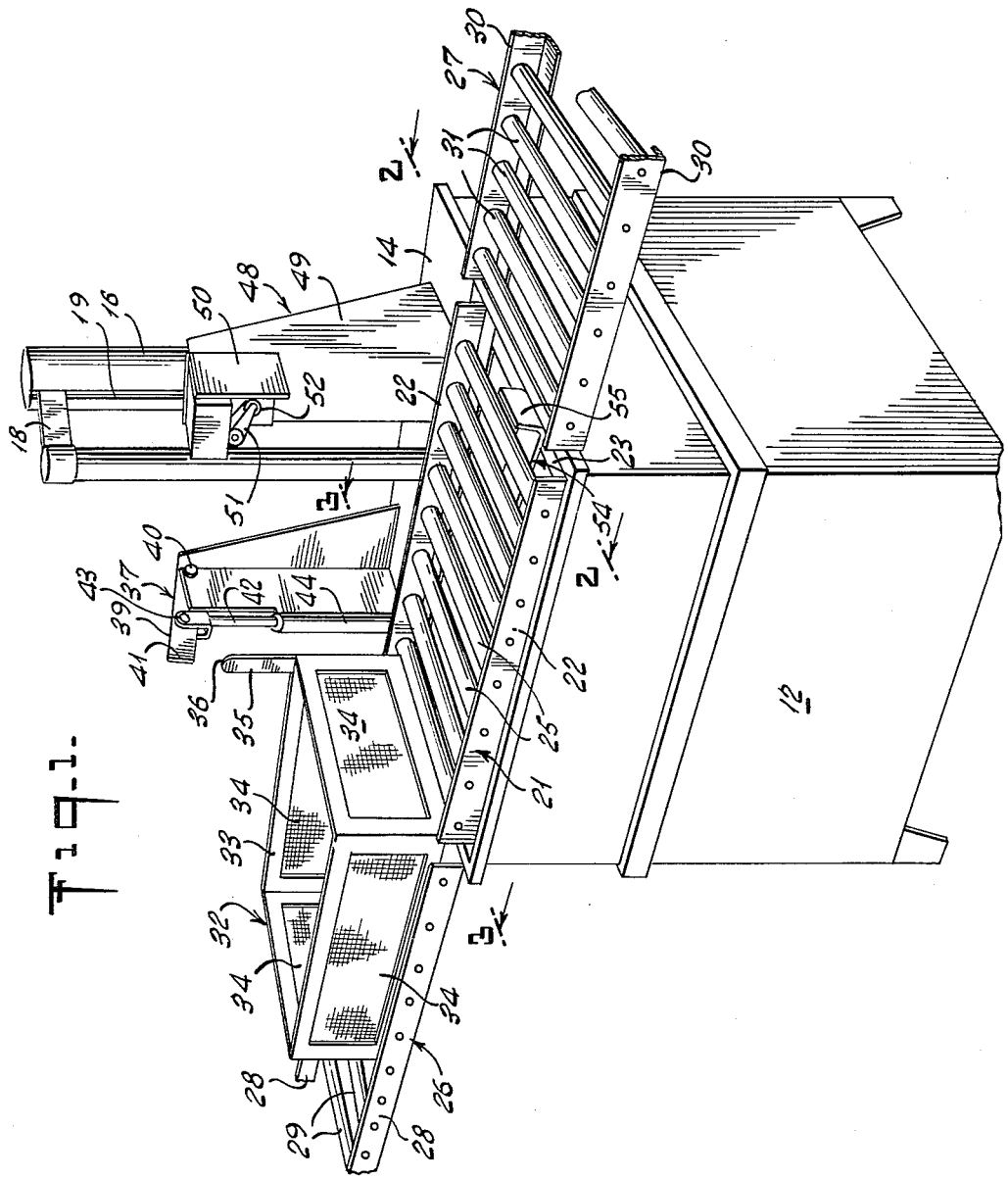

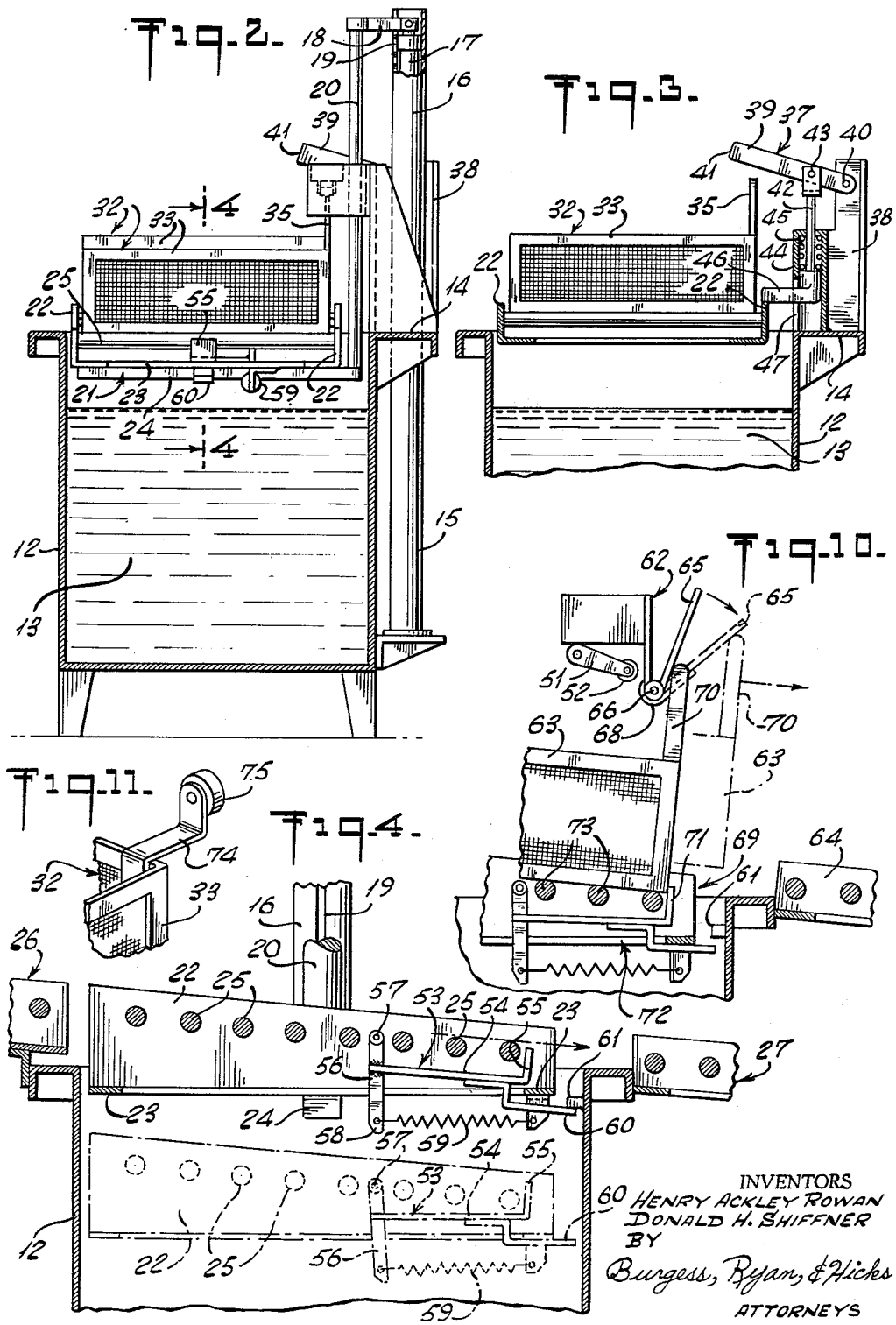

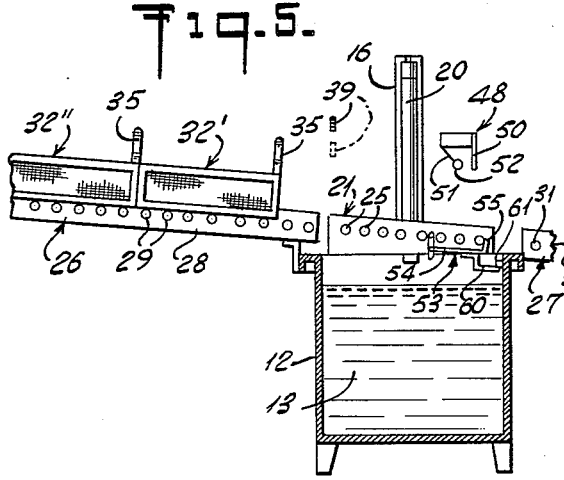
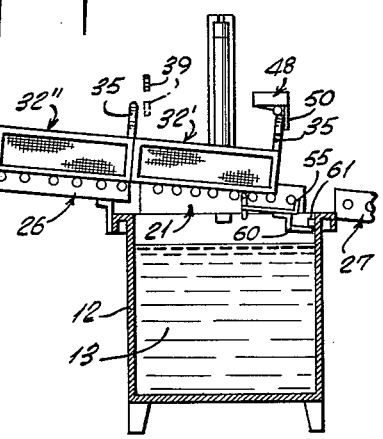
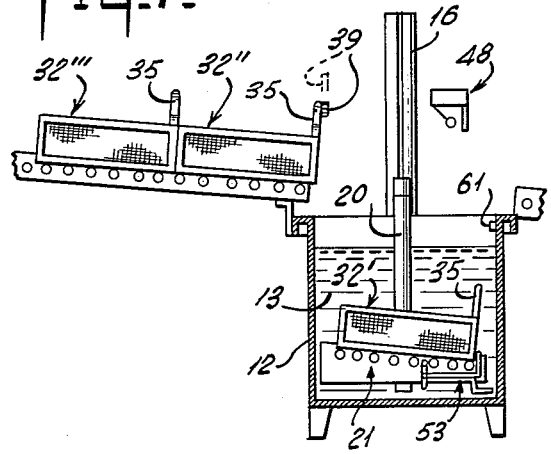
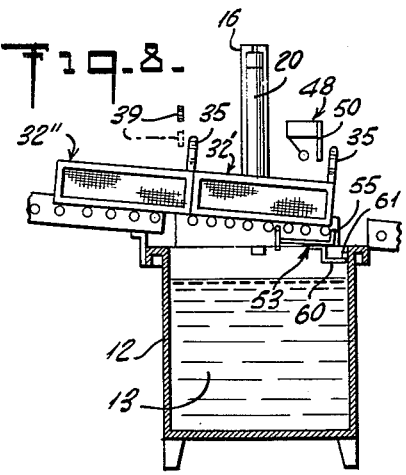
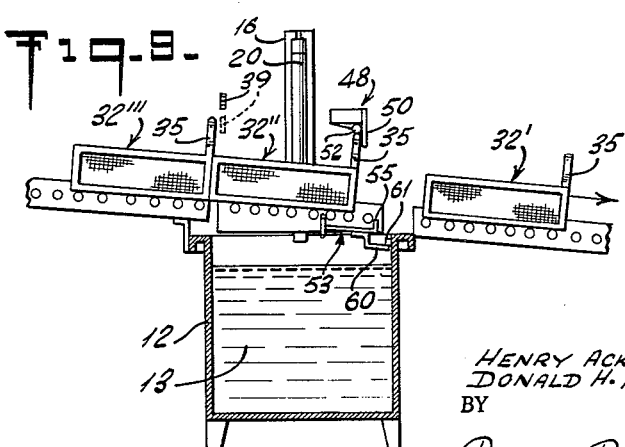

3,083,716
APPARATUS FOR CLEANING INDUSTRIAL PARTS
Henry A. Rowan and Donald H. Shiffner, Plainfield, N.J., assignors to Magnus Chemical Company, Inc., New York, N.Y., a corporation of New York
Filed Mar. 14, 1962, Ser. No. 179,674
10 Claims. (Cl. 134—46)

The present invention relates to an industrial washing machine for cleaning small parts in baskets and more particularly to such a machine having provision for automatically loading and unloading a series of baskets by means of a roller conveyor.

Industrial washing machines are available which are adapted to clean large numbers of small metal parts in a mesh basket by vertically reciprocating the basket in a tankful of cleaning fluid. Such machines are equipped with a perforated, vertically movable rack or platform on which the baskets rest during the cleaning operation. The rack may be raised above the level of the cleaning fluid when it is desired to load or unload a basket of parts.

Where a large number of baskets of parts are to be cleaned, it is desirable that the functioning of the machine be made automatic, so that an operator need not devote constant attention to the machine. Timing devices, similar to those used in home laundry or dishwashing machines, are available to control the washing machine during a complete washing cycle, lowering the loaded rack into the cleaning fluid, reciprocating it vertically therein for a pre-selected time period, and then raising the rack above the level of the cleaning fluid for unloading.

It is an object of the present invention to provide an apparatus for automatically loading and unloading baskets onto the rack during successive washing cycles.

It is a further object of the invention to provide a loading and unloading apparatus in which the baskets are moved on and off the rack by the force of gravity.

It is a still further object of the invention to provide switch means responsive to the movement of a basket onto the rack for beginning a washing cycle.

Other objects of the invention will be obvious from the description below read in conjunction with the accompanying drawings, in which:

FIG. 1 is a perspective view of a washing machine equipped with the automatic loading and unloading device of the invention;

FIG. 2 is a cross sectional view on plane 2—2 of FIG. 1;

FIG. 3 is a cross sectional view on plane 3—3 of FIG. 1;

FIG. 4 is an enlarged partial cross sectional view on plane 4—4 of FIG. 2 with the rack in the fully raised position;

FIGS. 5-9 are cross sectional view on plane 4—4 showing five successive steps in the washing cycle;

FIG. 10 is a partial enlarged cross sectional view similar to that of FIG. 4 showing an alternative construction; and FIG. 11 is a perspective view of a detail of an alternative basket construction.

FIG. 1 shows an industrial washing machine of a well-known type. A tank 12 holds a quantity of cleaning fluid 13. Shelf 14 projecting from the rear of the tank serves as a support for air cylinder 15 and cylindrical extension 16 of the air cylinder. Piston 17 is slidably mounted in the air cylinder and the cylindrical extension. Arm 18 extends horizontally from the top of the piston through slot 19 in the cylindrical extension. Column 20 drops vertically from the outer end of arm 18 and is joined to a horizontal rack 21 located within the tank. The connections between the piston, arm, column, and rack are rigid and these elements move together.

In washing machines of the type illustrated compressed air is supplied to the air cylinder to raise the piston therein. The representation of the cylinder and piston construction is schematic in the drawings, details of the compressed air piping and valves having been omitted. Reference is made to United States Patent No. 2,857,923 to Marcel Zinty in which the details of the construction and operation of machines of this type are explained. The piston of such machines may be made to assume a raised position (as in FIGS. 1 and 5) in which the rack is raised clear of the surface of the fluid in the tank. By proper operation of air valves the piston may be lowered and the rack submerged close to the bottom of the tank as in FIG. 7. Further changes in the valve settings will cause the piston to reciprocate rapidly in a vertical direction over a short stroke length, moving the rack up and down in the cleaning fluid near the bottom of the tank. Finally, the air valves may be reset to cause the piston to rise again to the upper position of FIG. 1, completing the washing cycle. The changes in air valve settings required to operate the washer may be made by hand or by an automatic timer.

In order to facilitate loading of the movable rack it is comprised of a section of a roller conveyor comprised of parallel side angle irons 22, 22 fastened in spaced relation by welded crosspieces 23 and supported by a crossbar 24 welded to the bottom of column 20. A series of parallel rack rollers 25 extend between the side angle irons 22 and are free to rotate about their axes. The rack rollers are arranged in a plane which is slanted downward toward one side of the tank, as may best be seen in FIG. 4.

Arranged adjacent the washing machine in the embodiment of FIG. 1 are an input conveyor 26 and an output conveyor 27. The input conveyor is comprised of input side angle irons 28, 28 supporting input rollers 29. Output conveyor 27 is comprised of similar output side angle irons 30, 30 supporting output rollers 31. When the rack is in the raised position of FIG. 1 the rack rollers, the input rollers, and the output rollers lie in a common slanting plane. The slant is sufficient to insure that flat objects placed on the input conveyor will, in the absence of obstructions, roll across the rack onto the output conveyor.

The work holding basket 32 has a frame 33 of solid metal strips with wire mesh panels 34 on its sides and bottom. The wire mesh allows free flow of the cleaning fluid about any parts which are in the basket when the basket is reciprocated on the rack during a washing operation. Projecting vertically from a corner of the basket is an extension 35 having a rounded end 36.

An entrance gate structure 37 is supported on shelf 14 adjacent the position where the input conveyor and the rack meet. The entrance gate structure is a fixed gate support member 38 and a swinging gate 39 rotatable about pivot 40 in a vertical plane. The outer end 41 of swinging gate 39 may be moved from the raised position shown in FIG. 1 to a lowered position (shown in dotted lines in FIG. 5) in which it blocks passage of baskets from the input conveyor onto the rack by contacting extension 35. As may best be seen in FIG. 3 the position of swinging gate 39 is controlled by pushrod 42 which is pivoted to the gate at 43 and rides in pushrod cylinder 44. Coil spring 45 inside the pushrod cylinder biases the gate toward the lowered position. Pushrod arm 46 extends horizontally from the bottom of the pushrod through slot 47 into the path of the rack as the rack rises into the upper position. Thus, as the rack rises through the last few inches of its travel, the swinging gate is lifted from its lowered to its raised position. This device allows a basket to roll by gravity from the input conveyor onto the rack when the empty rack is raised, while preventing baskets from falling from the input conveyor into the tank when the rack is in a lowered position.

Also supported by shelf 14 is fixed stop structure 48. The fixed stop structure comprises stop support member 49 to which is welded a fixed stop 50 in the form of a rectangular metal plate. The plane of the plate is vertical and it is located in the path of extension 35 on baskets rolling onto the rack rollers 25 when the rack is in the raised position. Also located in the path of extension 35 under these circumstances is switch arm 51 bearing a switch roller 52 on its outer end. The switch arm pivots upward when contacted by extension 35 closing an electric circuit and beginning the washing cycle by activating a timer (not shown) which in turn positions air valves (also not shown) controlling the rack position.

Attached to the underside of the rack is rack stop 53, best seen in FIG. 4. The rack stop is a metal plate 54 having a turned-up lip 55. Welded to the rack stop is stop bar 56 mounted for rotation in a vertical plane about pivot 57, which extends between side angle irons 22, 22. The lower end 58 of the stop bar is drilled to receive one end of coil spring 59, the other end of which is hooked to anchor member 60 on crosspiece 23. The effect of the coil spring is to move the rack stop 53 to the raised position shown by the dashed lines in FIG. 4 and also in FIG. 7. In the raised position the lip 55 projects upward above the plane of the top of rack rollers 25 and prevents a basket on the rack from rolling off the lower end thereof. Welded to the underside of metal plate 54 is projection 60, the outer end of which extends beyond the edge of the rack into a position of close proximity to the tank wall. Extending inward from the tank wall is catch 61, so located that as the rack moves upward from the position shown by dashed lines in FIG. 4 to that shown by solid lines in that figure the catch engages and detains projection 60. This engagement causes rotation of the metal plate 54 about pivot 57, stretching coil spring 59 and depressing lip 55 below the level of the tops of rack rollers 25. In this depressed position the rack stop presents no barrier to the movement of a basket from the rack rollers to the output conveyor.

FIGS. 5–9 illustrate various steps in the operation of the washing machine. In FIG. 5 the rack is in the upper position, the swinging gate 39 is raised, and the rack stop 53 is depressed. FIG. 5 shows two baskets 32′ and 32″ sliding toward the washing machine on the input conveyor. FIG. 6 shows basket 32′ after it has rolled onto the rack 21 and is in an intermediate position. Extension 35 of basket 32′ abuts fixed stop 50 and has raised switch arm 51. The switch thereupon initiates the cleaning cycle and the rack drops into the lower position of FIG. 7, submerging basket 32′. As the rack moves downward from the position of FIG. 6 to that of FIG. 7 the swing gate 39 drops to the lower position shown by solid lines in FIG. 7, blocking further motion of basket 32″. Lip 55 of rack stop 53 rises above the level of the rack rollers upon lowering of the rack. As soon as the rack drops far enough so that extension 35 is clear of fixed stop 50 the basket 32′ on the rack rolls forward until it is caught by lip 55. In this position the basket 32′ is reciprocated and the parts it contains are washed. Washing having been completed, the rack rises to the position of FIG. 8. The forward motion of the basket into contact with rack stop 53 upon lowering of the rack is sufficient so that in the FIG. 8 position extension 35 has passed fixed stop 50. As the rack reaches its fully raised position rack stop 53 drops and basket 32′ is free to roll off the rack onto the output conveyor 27 as in FIG. 9. Since swinging gate 39 also rises as the rack reaches the fully raised position, the next basket, basket 32″, is free to roll onto the rack. The washing cycle then repeats itself, cleaning the parts in basket 32″ while basket 32‴ is held back by swinging gate 39. As long as baskets remain waiting on the input conveyor the machines continuously cleans their contents and delivers them to the output conveyor.

FIG. 10 illustrates a modified fixed stop structure 62 designed to push the basket 63 of washed parts off the rack onto the output conveyor 64. To the fixed stop structure of FIG. 1 has been added a push-plate 65 rotatable about hinge 66 attached to fixed stop 67. Coil spring 68 normally maintains push plate 65 in the position shown by dotted lines in FIG. 10. When the loaded rack 69 rises extension 70 on basket 63 abuts the push plate 65 and moves it to the position shown by solid lines in FIG. 10, winding up the coil spring. As the rack continues to rise the lip 71 of rack stop 32 drops below the level of the tops of rack rollers 73, releasing the basket. The basket is then propelled off the rack rollers onto the output conveyor both by gravity and by the coil spring, which rotates push-plate 65 as shown by the arrow in FIG. 10. A leaf spring may be substituted for the push-plate 65, coil spring 68 and hinge 66 of FIG. 10, if desired.

FIG. 11 illustrates a modified basket structure in which an offset arm 74 bears at its outer end a ball-bearing roller 75 as a substitute for extension 35 of the FIG. 1 basket. The roller reduces friction between the basket and the fixed stop structure, while the offset arm permits the use of set-back stops which do not extend vertically over the basket, as do those in FIG. 2. This may be desirable where the basket is to carry a single large part which extends above the top of the basket. Such a large part might interfere with operation of the swinging gate or the fixed stop in the FIG. 2 construction.

While FIG. 1 illustrates a single washing machine fed by an input conveyor and passing the basket of washed parts onto an output conveyor, modifications of this arrangement are possible. For example, it may be desired to pass a basket of parts from the rack of one washing machine directly onto the rack of a second similar machine for a second washing step. In such a case a number of machines may be located side by side, each successive machine being slightly lower than the last to insure proper gravity feed, and the baskets passed from one machine directly to the next.

The embodiment of FIG. 1 is designed to handle successive baskets from a line of baskets waiting on an input conveyor. Waiting baskets are held back by entrance gate structure 37. In some installations there may be no need for an input conveyor or for the entrance gate structure, as where the rate of input of dirty parts is so even that backlogs of waiting baskets do not develop. In this case the machine of FIG. 1 without the input conveyor or entrance gate may be employed, each basket being loaded directly onto the rack. Loading having been completed, the washing cycle will follow and the basket of washed parts will be automatically shunted onto the output conveyor for further processing.

As used herein, the term "basket" is not limited to the wire mesh basket shown, but is intended to cover in addition tote boxes, pallets, and other similar structures which may contain and support the parts being cleaned during the processes of loading, cleaning, and unloading as described above.

What is claimed is:

1. In a washing machine having a tank adapted to hold cleaning fluid and a rack movable from a raised position above the tank to a lowered position within the tank below the level of the cleaning fluid and back to the raised position the improvement comprising
    (a) first means for supporting a basket containing parts to be washed while the basket rolls from a first position adjacent a first side of the tank onto the rack while the rack is in the raised position;
    (b) second means for cooperating with a part of the basket structure while the rack is in the raised position to arrest the rolling movement of the basket across the rack in a second position such that the rack and basket may be lowered into the tank, said second means disengaging from the basket and ceasing to impede its motion following a downward motion of the rack through a predetermined distance;
    (c) third means for promoting motion of the basket on the rack under the force of gravity toward a second side of the tank opposite to the first side of the tank after disengagement of the second means from the basket;
    (d) fourth means operative after disengagement of the second means from the basket for arresting the motion of the basket on the rack toward the second side of the tank in a third position closer to the second side of the tank than the second position;
    (e) fifth means operative upon movement of the rack back to the raised position to disengage the fourth means from the basket; and
    (f) sixth means for supporting the basket while the basket rolls off the rack from the third position.

2. The washing machine of claim 1 comprising seventh means for pushing the basket off the rack upon movement of the rack back to the raised position.

3. An industrial washing machine comprising
    (a) a tank adapted to hold a quantity of cleaning fluid;
    (b) a movable rack;
    (c) means for lowering the movable rack from a raised position to a lowered position within the tank beneath the level of cleaning fluid in the tank and for subsequently raising the rack to the raised position;
    (d) rack rollers on the rack arranged in a slanting plane adapted to receive a basket of parts and support said basket while said basket rolls across the rack from a first side of the tank to a second side of the tank;
    (e) a fixed stop suspended above the rack in the path of a basket rolling across the rack when the rack is in the raised position adapted to contact an extension of the basket and halt the basket on the rack in an intermediate position, said fixed stop disengaging from the basket upon motion of the rack downward from the raised position;
    (f) a rack stop movable into a blocking position above the plane of the tops of the rollers in the path of a basket rolling across the rack, in which blocking position the rack stop is adapted to contact the basket and halt the basket on the rack after the basket has rolled from the intermediate position toward the second side of the tank, the rack stop being movable into a withdrawn position clear of the path of the basket in which the rack stop presents no obstacle to the passage of the basket over the rack;
    (g) means for moving the rack stop into the blocking position upon motion of the rack downward out of the raised position;
    (h) means for moving the rack stop into the withdrawn position upon motion of the rack into the raised position.

4. The machine of claim 3 comprising means for pushing the basket toward the second side of the tank upon movement of the rack into the raised position.

5. The machine of claim 3 comprising switch means activated by the passage of a basket onto the rack for initiating a washing cycle.

6. The washing machine of claim 1 comprising means for blocking the movement of a basket from the first position toward the rack when the rack has moved from the raised position.

7. Industrial washing apparatus comprising
    (a) a tank adapted to be filled to a desired fluid level with cleaning fluid;
    (b) a rack movable during a washing cycle from a raised position above the desired fluid level to a lowered position within the tank beneath the desired fluid level and back to the raised position;
    (c) a plurality of rack rollers on the rack arranged with parallel horizontal axes of rotation, the uppermost portions of the rollers lying in a rack support plane slanted downward from a first side of the tank toward a second side of the tank opposed to the first side of the rack rollers being adapted to support an object having a flat bottom in a sufficiently frictionless manner to allow rolling of said object across the rack toward the second side of the tank;
    (d) an input conveyor alined with the rack support plane when the rack is in the raised position, said input conveyor adapted to feed objects onto the rack rollers from the first side of the tank;
    (e) an output conveyor alined with the rack support plane when the rack is in the raised position adapted to receive objects rolling off the rack on the second side of the tank;
    (f) a basket adapted to hold parts to be washed and to roll along the rack rollers;
    (g) an extension on the basket;
    (h) an entrance gate movable from a withdrawn position to a blocking position, said entrance gate in the blocking position being adapted to block passage of baskets from the input conveyor to the rack rollers and in the withdrawn position being adapted to allow passage of baskets from the input conveyor to the rack rollers;
    (i) gate control means for placing the entrance gate in the withdrawn position when the rack enters the raised position and in the blocking position when the rack leaves the raised position;
    (j) a fixed stop located in the path followed by the extension on the basket as the basket rolls on the rack rollers from the first side of the tank toward the second side of the tank while the rack is in the raised position, the fixed stop being adapted to contact the extension and to halt the motion of the basket in an intermediate position on the rack, said fixed stop lying outside the paths of the basket and extension when the basket rolls across the rack from the first to the second side of the tank while the rack is in the lowered position and said fixed stop lying outside of the paths of the basket and extension when the basket rolls across the rack from a washing position to a position off the rack when the rack is in the raised position;
    (k) a rack stop movable between a blocking position and a withdrawn position, the blocking position being one in which the rack stop is adapted to arrest the motion of a basket rolling over the rack rollers from the intermediate position toward the second side of the tank stopping said basket in a washing position closer to the second side of the tank than the intermediate position and the withdrawn position being one in which the rack stop allows motion of the basket over the rack rollers;
    (l) rack stop control means for moving the rack stop into the blocking position when the rack moves out of the raised position and into the withdrawn position when the rack moves into the raised position.

8. The apparatus of claim 7 comprising a contact switch on the fixed stop adapted to be operated by contact with a basket rolling onto the rack and, when activated, to initiate a washing cycle.

9. The apparatus of claim 8 comprising propulsion means adapted to push the basket toward the second side of the tank upon raising of the rack while the basket is in the washing position.

10. The apparatus of claim 9 in which the propulsion means comprises a push plate movable from a first to a second position under the influence of pressure from a portion of a basket in the washing position on the rack as the rack rises into the raised position and spring means biasing the push plate toward the first position, said push plate being adapted to push the basket off the rack upon disengagement of the rack stop from the basket by movement of the push plate from the second to the first position under the influence of the spring means.

References Cited in the file of this patent

UNITED STATES PATENTS 1,960,339     Howard _____ May 29, 1934